United States Patent
Gunning, III et al.

(10) Patent No.: US 8,237,101 B2
(45) Date of Patent: Aug. 7, 2012

(54) OBJECT TRACKING SYSTEM HAVING AT LEAST ONE ANGLE-OF-ARRIVAL SENSOR WHICH DETECTS AT LEAST ONE LINEAR PATTERN ON A FOCAL PLANE ARRAY

(75) Inventors: William J. Gunning, III, Newbury Park, CA (US); Dale Hollis, Thousand Oaks, CA (US); Alexander A. Bogdanov, Simi Valley, CA (US); Steven Chen, Thousand Oaks, CA (US); Bing Wen, Thousand Oaks, CA (US); Jian Ma, Thousand Oaks, CA (US); Donald Taber, Newbury Park, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 382 days.

(21) Appl. No.: 12/648,709

(22) Filed: Dec. 29, 2009

(65) Prior Publication Data
US 2011/0079703 A1 Apr. 7, 2011

Related U.S. Application Data

(60) Provisional application No. 61/248,321, filed on Oct. 2, 2009.

(51) Int. Cl.
*H01J 40/14* (2006.01)

(52) U.S. Cl. .................................... 250/221; 250/203.2
(58) Field of Classification Search .................. 250/221, 250/214.1, 203.2, 203.3, 208.1, 214 R; 356/4.01; 340/539.13, 539.22, 555–557, 10–1; 702/150–153
See application file for complete search history.

(56) References Cited

U.S. PATENT DOCUMENTS
6,487,516 B1 * 11/2002 Amorai-Moriya ............ 702/152
* cited by examiner

*Primary Examiner* — Que T Le
(74) *Attorney, Agent, or Firm* — Koppel, Patrick, Heybl & Philpott (57) ABSTRACT

An optical tracking system comprises an array of point source emitters that output respective optical emissions, and a plurality of angle of arrival sensors. Each sensor comprises one or more optical elements and a focal plane array (FPA), with the optical elements arranged to resolve the optical emissions into one or more linear patterns on the FPA. A processing system in communication with the sensors establishes the orientation and position of each of the optical emitters using the linear patterns. A headgear tracking system employs point source emitters on a piece of headgear, with front and rear arrays of angle of arrival sensors located in an aircraft cockpit; a processing system in communication with the sensor arrays establishes an orientation and position for each of the optical emitters on the headgear.

37 Claims, 3 Drawing Sheets

OBJECT TRACKING SYSTEM HAVING AT LEAST ONE ANGLE-OF-ARRIVAL SENSOR WHICH DETECTS AT LEAST ONE LINEAR PATTERN ON A FOCAL PLANE ARRAY

RELATED APPLICATIONS

This application claims the benefit of provisional patent application No. 61/248,321 to Gunning III et al., filed Oct. 2, 2009.

BACKGROUND OF THE INVENTION

1. Field of the Invention

This disclosure relates to tracking the position and orientation of an object moving within a three-dimensional spatial region, using a set of point source emitters that output respective optical emissions within the field-of-view (FOV) of a sensor array comprising one or more optical angle of arrival sensors.

2. Description of the Related Art

Tracking the movement and/or orientation of an object quickly and precisely is critical for a variety of military and civilian applications. The efficacy of tracking systems is often based on the detection and processing of several parameters related to movement and orientation. These parameters vary depending on the implementation, and can include magnetic, acoustic and inertial measurements that reveal the position and pose or orientation of the tracked object. Current solutions are limited due to their susceptibility to noise or imprecise measuring and processing techniques of these parameters. Conventional tracking systems that employ magnetic sensors are strongly affected by surrounding metallic structures and moving metal in the measurement area. Currently implemented optical sensing systems similarly suffer from undesirable sunlight effects and often have low resolution that is limited by the need to view illuminated patterns on the object being tracked. Inertial measurement units (IMUs) experience undesirable IMU drift, and acoustic sensing systems are limited by their low acoustic update rate.

A need exists for accurate and low latency methods to determine and track the position and orientation (pose) of an object within a defined environment. For example, in an aircraft cockpit there are many applications where the pilot's helmet includes a head mounted display that provides situational awareness where, by tracking the pilot's helmet orientation, the system directs the view of external sensors. Alternatively, the orientation of the pilot's helmet may be used to direct (cue) the aim point of a weapon system. A helmet tracking system may also be used in various ground and underwater vehicles to provide the driver or occupant with a sensor-based view of the external environment with a head-directed viewing direction. Other applications for an object tracking system include assembly operations as in architectural construction or assembly of large systems such as aircraft. There are also applications for use with remote medical (surgical) equipment.

Various methods have been developed for object tracking systems. For example, helmet tracking methods include the use of magnetic sensors (see, e.g., "Adaptive magnetic tracker—A revolution in electro-magnetic tracker technology," Y. Kranz, G. Kornblau, S. Stoker, SPIE Proceedings, Vol. 5442, pp. 149-156 (2004)), ultrasonic (acoustic) sensors (see, e.g., U.S. Pat. No. 6,141,293), miniature inertial sensors, and optical sensors or combinations of these. Magnetic sensors have the features of accuracy, speed, detection range, and small size. They, however have the significant disadvantage in that their accuracy requires precision mapping of the magnetic environment in the cockpit where most metal objects will distort the magnetic field distribution. This mapping is time consuming and troublesome and can be susceptible to changes in the environment (moving metal or relocated equipment). Ultrasonic methods have rather low update rates because multipath (echo) effects require an extended time between measurements. Miniature inertial sensors, for example Microelectromechanical Systems (MEMS) devices, suffer from relatively short term drift and require frequent recalibration from another type of sensor in a hybrid architecture.

Markos ("All-optical helmet tracker for multi-craft multi-vehicle systems", C. T. Markos, J. J. Atkinson, G. Wyntjes, SPIE proceedings, Vol. 5079, pp. 86-94 (2003)) describes one scheme that includes several optical transmitters positioned within the cockpit together with receivers mounted on the helmet. An optical phase measurement method is used to determine the distance from each helmet receiver from the transmitter source. Processing this information, this approach achieves angular resolution of 3 mrad and position resolution to 250 microns. However, the data update rate of 125 Hz can introduce sufficient latency into the system to cause errors in targeting. Also the normal expansion and contraction of the crew station (cockpit) causes the locations of the transmitters (emitters) to change. This may result in significant measurement error.

The optical tracking method of Tawada and Hirooka ("A new optical HMT system based on image processing," K. Tawada and K. Hirooka, SPIE Proceedings, Vol. 6955, 69550A-1 to 69550A-11 (2008)) is based on the combination of image processing based optical sensing, integrated with inertial sensors. The optical image processing method includes multiple sensors that detect markers that are located in the environment. The image of these markers is processed to determine the relative range, position, and orientation between the marker and the sensor. This type of approach requires the processing of 2D images and is claimed to result in position error to better than one pixel. However, processing of a complete 2D image can be time consuming, which can be an issue for applications requiring rapid response. Additionally, the field of view of the optical sensors is limited in this situation to a distance necessary for the sensors optics to capture the entire image. This severely limits the size of the three dimensional area being measured.

Odell and Kogan ("Next generation, high accuracy optical tracker for target acquisition and cueing," D. S. Odell and V. Kogan, SPIE Proceedings, Vol. 6224, 62240C-1 to 62240C-10 (2006)) describe yet another optically based tracker. Their method measures the angle between an array of point source emitters (LEDs) mounted on a helmet and multiple optical sensors that are placed in the cockpit. Each sensor comprises a linear detector array and employs "a transmissivity mask which is located a known distance above the linear detector." The mask is a superposition of three periodic patterns which is imaged onto the linear detector. Analysis of the pattern on the detector arrays determines the angle of each emitter in a plane. Multiple measurements using sensors having their linear detector arrays oriented in orthogonal directions result in a determination of the position and orientation of the helmet. This system suffers from extraneous sources of light that are frequently present in the cockpit in which it is operated.

SUMMARY OF THE INVENTION

The optical tracking technology that is the subject of the present invention overcomes the limitations of the methods described above. It comprises an array of point source emitters (typically LEDs) and optical sensors that provide a computationally efficient, high accuracy, and high speed optical tracking system. Each optical sensor includes optical elements that, when illuminated by a point source, create an image of a line, or preferably, a pair of perpendicular lines, that form a cross pattern onto the imaging array of the sensor. The position of the line or cross pattern on the imaging array is determined by the angle between the direction of arrival of the optical signal and the central axis of the optics of the sensor, thereby making the sensor an angle of arrival sensor. This pattern may be analyzed efficiently, with high speed and accuracy, to determine the relative angles between each emitter and each sensor.

In one embodiment, one or more point source emitters are arranged to output respective optical emissions. A plurality of angle of arrival sensors are provided, each of which comprises one or more optical elements and a focal plane array (FPA), with the optical elements arranged to resolve the optical emissions into one or more linear patterns on the FPA. One or more angle of arrival sensors may be employed to form a 'sensor array' having respective fields of view which encompass the optical emitters. A processing system in communication with the angle of arrival sensors is configured to establish an orientation and position for each of the plurality of optical emitters using the one or more linear patterns.

In one particular application, one or more point source emitters are arranged on a helmet to output respective optical emissions. Front and rear sensor arrays are located in an aircraft cockpit, with each array comprising one or more angle of arrival sensors which resolve the optical emissions into one or more linear patterns. A processing system in communication with the front and rear sensor array is configured to establish an orientation and position for each of the optical emitters using the one or more linear patterns.

The present invention may be arranged with the emitters attached to the tracked object and the sensors arranged within the environment of the tracked object to detect the angle of arrival of the emitted signals and calculate the position and orientation (pose) of the tracked object. Alternatively, the sensors can be attached to the tracked object and the emitters placed in the surrounding space, or some emitters and sensors can be attached to the tracked object, and some emitters and sensors placed in the environment.

Further features and advantages of the invention will be apparent to those skilled in the art from the following detailed description, taken together with the accompanying drawings.

DETAILED DESCRIPTION OF THE INVENTION

This disclosure relates to tracking the position and orientation (also known as "pose") of a rigid tracked object within a three-dimensional spatial region or environment using a set of optical emitters which are point sources. The emitters, which can be LEDs, lasers, or laser diodes, for example, are referred to herein as 'point source emitters' or simply 'emitters', and their respective light outputs are referred to herein as 'optical emissions'. Each emitter is arranged to emit light over a range of angles, rather than as a narrow beam. One or more 'angle of arrival' sensors is arranged to detect and determine the angle of arrival of each optical emission within the sensor's FOV. As the tracked object moves through space, the emitters or sensors mounted to its surface move with it. Changes to the relative sensor and emitter positions cause the optical signals emitted by the point source emitters to arrive at different angles at the receiving sensors. The sensors detect the angles of arrival and transmit the information to a processing system (also referred to as a "state estimator") for calculating the position and orientation of the tracked object.

Figure 1:
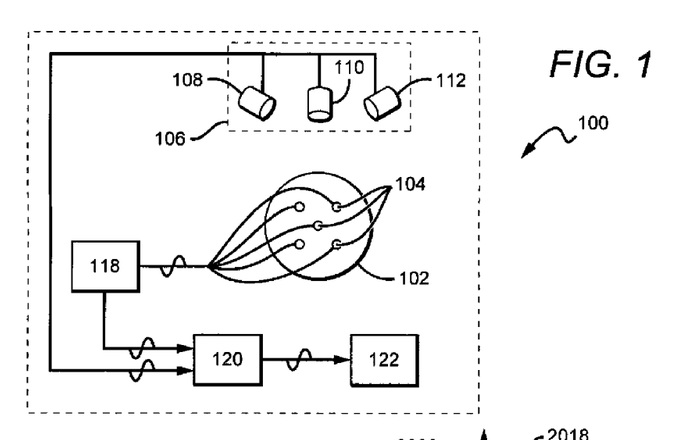
FIG. 1 shows a top view of the object tracking system with one set of emitters attached to a tracked object and one sensor array.

FIG. 1 shows one embodiment of an object tracking system 100. A tracked object 102 is arranged to be within the optical FOV of a sensor array 106, which includes, for example, one or more individual angle of arrival sensors 108, 110 and 112. Only three sensors are shown for illustrative purposes; the number of individual sensors in sensor array 106 can vary. A set of point source emitters 104 is attached to the tracked object 102. The sensor array 106 is arranged to detect the light emitted by the set of emitters 104; each emitter's light is referred to herein as an 'optical emission'. In an alternative embodiment, the sensor array 106 may be mounted on the tracked object 102, and the set of emitters 104 placed in the surrounding environment.

The set of emitters 104 and individual sensors 108, 110 and 112 are driven and controlled by an electronic control system 118. The electronic control system 118 may be connected to the sensor array 106 and emitters 104 by physical wire or wirelessly. The electronic control system 118 preferably uniquely identifies the particular emitter that is emitting at any given time to a processing system 120, which is also known as a "state estimator." The processing system 120 receives and correlates this identifying information with the angle of arrival information received from each of the sensors in the sensor array 106 to determine the position and orientation of the particular emitter emitting the signal. Since the set of emitters 104 is attached to the tracked object 102, the processing system 120 can utilize the angle of arrival information for each emitter to calculate the position and pose of the tracked object 102. The sensor array 106 is comprised of optically receptive devices, and is arranged such that the fields of view of angle of arrival sensors 108, 110, 112 encompass the set of emitters 104.

As noted above, the present system may be arranged with the emitters attached to the tracked object and the sensors arranged within the object's environment, the sensors can be attached to the tracked object and the emitters placed in the environment, or some emitters and sensors can be attached to the tracked object, and some emitters and sensors placed in the environment.

For proper operation, the positions of the point source emitters and/or the positions and orientations of the sensors mounted to the tracked object must be calibrated and accurately known. Similarly, the positions of the point source emitters and/or the positions and orientations of the sensors arranged within the tracked object's environment must also be calibrated and accurately known.

It is also necessary that, when multiple point source emitters and/or sensors are employed, the relative spatial relationship between the emitters/sensors mounted to the tracked object remains fixed while the system is operating. For this reason, it is important that the tracked object be rigid. Similarly, the relative spatial relationship between the emitters/sensors arranged within the tracked object's environment must also remain fixed while the system is operating.

Each angle of arrival sensor of the sensor array 106 includes optical elements arranged to produce one or more linear patterns on a focal plane array (FPA) upon receiving the optical emission from a point source emitter. These pattern(s) may be, for example, an individual line, or, preferably, a pair of perpendicular lines that form a cross pattern. The type of linear pattern produced depends on the type of sensor used. The position of the pattern on the FPA is determined by the angle between the direction of arrival of the optical emission and the central axis of the optics of the sensor. One angle of arrival sensor suitable for use with the present object tracking system is described in more detail in U.S. patent application Ser. No. 12/401,027, which is hereby incorporated by reference.

Figure 2:
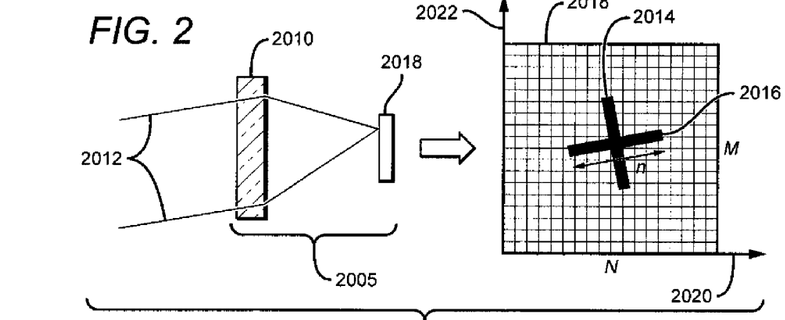
FIG. 2 shows a sensor in more detail, including an optical element and a focal plane array.

FIG. 2 shows one possible embodiment of an individual angle of arrival sensor 2005 of the sensor array 106. Each sensor is comprised of one or more optical elements 2010 optically coupled with an FPA 2018. The optical elements 2010 receive incoming light 2012 from a point source emitter (not shown) and form at least one narrow width line 2014, 2016 on FPA 2018. The FPA in FIG. 2 is comprised of an M×N row and column array of pixels. The system is preferably arranged such that the imaged lines are oblique with respect to the FPAs row and column axes 2020, 2022, with each traversing at least two rows or columns (preferably three rows or columns) along its length. The width of the line or lines is preferably equal or approximately equal to the FPA pixel width. An optical element which forms two perpendicular narrow width lines that form a cross-pattern on the FPA, as shown in FIG. 2, is preferred, though a system which forms just a single narrow width oblique line could also be used.

The optical lens elements 2010 of each individual sensor 2005 may be, for example, a diffractive optical element (DOE) used in combination with a circular lens, one or more birefringent cylindrical lens, or a single cylindrical lens.

Figure 3:
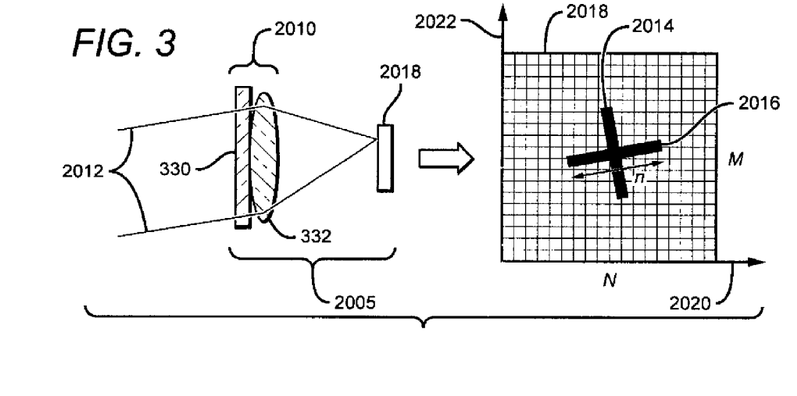
FIG. 3 shows an embodiment having a diffractive optical element (DOE) and lens as optical elements for generating a cross pattern on a focal plane array.

FIG. 3 illustrates one embodiment in which optical element 2010 consists of a DOE 330 and a lens (or a group of lenses) 332. When illuminated by a point source emitter, this DOE-lens assembly forms a cross pattern on the FPA 2018 comprising two orthogonal sharp lines.

Figure 4:
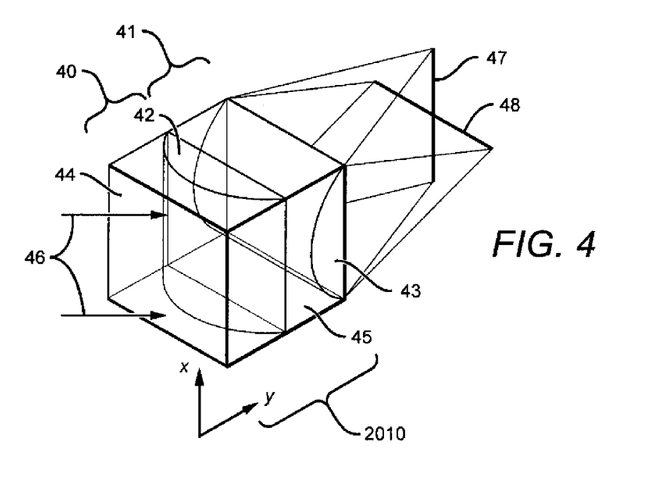
FIG. 4 shows an embodiment having a set of birefringent lenses as an optical element for generating a horizontal and vertical pattern.

FIG. 4 shows another possible embodiment, in which the optical elements 2010 consist of two orthogonal uniaxial birefringent cylindrical lens assemblies 40, 41. Here, each birefringent cylindrical lens is fabricated using a birefringent crystal material having uniaxial symmetry. A uniaxial birefringent material has a single optical symmetry axis, with a first refractive index value for light that is polarized perpendicular to the optical axis, and a second refractive value for light polarized parallel to the optical axis. Birefringent optical materials are described in detail in, for example, "Principles of Optics", Max Born and Emil Wolf, Pergamon Press, 6th edition (1980), pp. 678-689.

Each birefringent lens assembly consists of a positive cylindrical lens 42, 43 formed from birefringent material and a negative cylindrical lens 44, 45 formed from an isotropic (non-birefringent) material. Preferably, one lens assembly has a focusing power only in the x-direction for the x-polarization (or y-polarization) component of the light, and the other lens has a focusing power only in the y-direction for the y-polarization (or x-polarization) component of the light. When so arranged, an incoming light beam from a point source 46 with random or circular polarization forms cross-shaped lines 47, 48 on the FPA. The pair of birefringent lens assemblies is slightly rotated with respect to the FPA such that the lines forming the cross-pattern are slightly oblique with respect to the FPAs row and column axes and traverse at least two rows or columns (preferably three rows or columns) along the length of the imaged line. Note that the birefringent cylindrical lens assemblies might alternatively be arranged such that the positive cylindrical lens is formed from an isotropic material and the negative cylindrical lens is formed from a birefringent material.

In another embodiment, angle of arrival sensor 2005 may utilize cylindrical lenses to determine angles of arrival in a single plane that is perpendicular to the axis of the cylindrical lens. The individual sensors of the sensor array 106 can be arranged so that some measure the horizontal angle of arrival and others measure the vertical angle of arrival of the optical signals received from the emitters. Such an arrangement allows for the pose of the tracked object to be resolved uniquely. Thus, two sensors with cylindrical lenses resolve each point source emitter position to a line, provided both sensors detect the emitter's transmission.

Where the optical elements of the sensors of sensor array 106 include a DOE-lens assembly or birefringent lenses, the angle of arrival is detected with a single FPA.

Referring back to FIG. 1, a single sensor is sufficient to determine the complete angle of arrival information for signals emitted from each of the visible emitters 104. Thus, one sensor and at least three point source emitters are sufficient to determine a locally unique pose of a tracked object. Configurations with multiple sensors and/or additional emitters are preferred. The sensors are arranged to provide the best visibility of emitters on a tracked object throughout the full range of the tracked object's motion.

Figure 5:
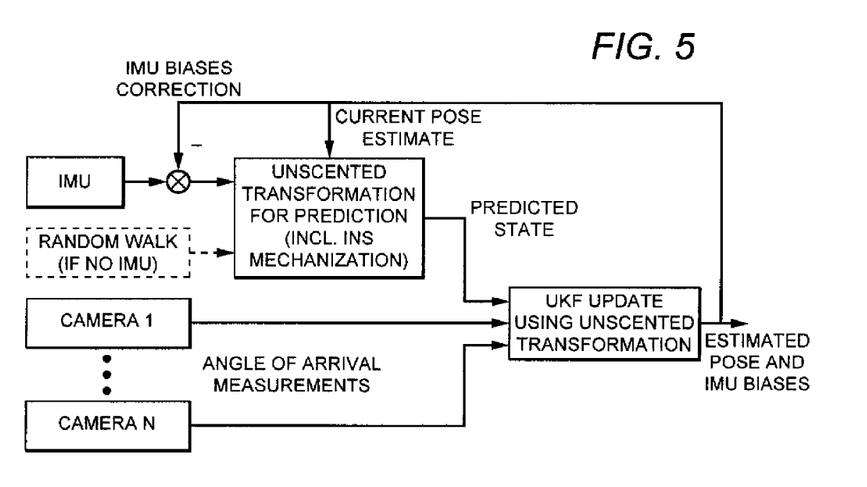
FIG. 5 shows a block diagram of one embodiment of the processing system.

Assuming the embodiments shown in FIGS. 2-4, the processing system 120 receives information from sensors 108, 110, 112 and calculates the optical angle of arrival for light received by each sensor in accordance with a tilt line algorithm, which is as follows: $\theta x = A(x) \cdot \tan^{-1}(x/f)$, and $\theta y = B(y) \cdot \tan^{-1}(y/f)$, where f is the focal length of the sensor's optical element, x and y are coordinates based on the position of the imaged lines on the FPA, and A(x) and B(y) are parameters that account for optical distortion and other imperfections of the system. A means for interpolating the position of the line or lines on the FPA is preferably used to provide the x, y coordinates. The tilt line algorithm is capable of achieving a pixel resolution of $\frac{1}{50}$ or more. This allows for detecting the angle of arrival of light to within 1 milliradian. The processing system 120 preferably uses a quaternion error-state formulation of a sigma-point Kalman Filter ("SPKF") for pose estimation. Examples of SPKF algorithms include an unscented Kalman filter ("UKF") [see for example J. L. Crassidis and F. L. Markley, "Unscented filtering for spacecraft attitude estimation," Journal of Guidance, Control, and Dynamics, vol. 26, no. 4, pp. 536-542, 2003], or a central difference Kalman Filter ("CDKF"), or their square root implementations to calculate the position and orientation (state vector) of the tracked object. The processing system employs dynamic or kinematic models of the tracked object to predict the object pose. The object model can be driven by inertial measurements from an inertial measurement unit (IMU) that contains gyroscopes and accelerometers. Alternatively, if an IMU is not used, a random walk process is used to drive the tracked object model. The predicted pose (and sensor biases if an IMU is used) are then corrected according to optical measurements from the angle of arrival sensors. One possible processing system signal flow diagram is shown in FIG. 5.

For all embodiments, the electronic control system 118 can identify the emitting emitter to the processing system 120 in many ways. In one embodiment, the electronic control system 118 drives the emitters 104 sequentially and synchronously and communicates the activation sequence to the processing system 120. In another embodiment, the electronic control system can control each emitter to encode its identification in its optical signal by emitting a unique identifying characteristic, such as an encoded identification number or unique modulation frequency.

Alternatively, all emitters may be pulsed simultaneously by the electronic control system 118. In this case, each emitter can be made to transmit identifying information encoded in its emission; several frames may be required to decode the emitter identities. In an alternate embodiment, the emitters may be pulsed simultaneously without the transmission of identifying information. In this event, tracking might be accomplished by data association (or correspondence) to identify the emitters. The data association may be performed according to a maximum likelihood criterion, for example, where the likelihood of observing each emitter at a given location is computed, and the one with the maximum value is accepted as the actually observed emitter, thus completing the identification process.

For all embodiments, the tracked object 102 can be one or more objects whose position and orientation (or "pose") is desired. For example, the tracked object 102 can include, but is not limited to, any type of helmet, a weapon, a robotic arm, an object in an assembly line, etc. The tracked object 102 is preferably trackable over six degrees of freedom using the set of emitters 104 and sensor array 106.

For all embodiments, the set of emitters 104 is preferably arranged to span the maximal practicable area on the surface of tracked object 102 (when emitters are placed on the object) or in the environment (when emitters are placed in the environment). Such an arrangement can improve the accuracy of information regarding the position, orientation and/or movement of the tracked object 102. For example, the emitters 104 may be arranged radially on the tracked object 102.

For all embodiments, the sensor array 106 is preferably arranged to detect light from the set of emitters 104 throughout the full range of motion of the tracked object 102. The sensor array 106 is ideally placed as close as possible, without incurring image blurring, to the tracked object 102, so that small movements of the tracked object 102 yield larger changes in angle of arrival of light from the set of emitters 104, thereby increasing sensitivity to the movements of tracked object 102. The number of emitters used can vary; increasing the number of emitters improves tracking accuracy of the tracked object. Multiple emitters can provide more robustness to noise, and increase the range of motion over which the object may be tracked without losing emitters from the FOV of the sensors. Therefore while a minimum of three emitters are required for tracking, using additional emitters yields better overall accuracy regarding the tracked object's position and orientation.

For all embodiments, the electronic control system 118 may be part of the processing system 120, or as shown in FIG. 1, a separate system that is electrically connected to the processing system 120. The position/orientation information is sent to an output system 122, which can comprise a display or tracking system including, but not limited to a missile or gun guidance system.

Figure 6:
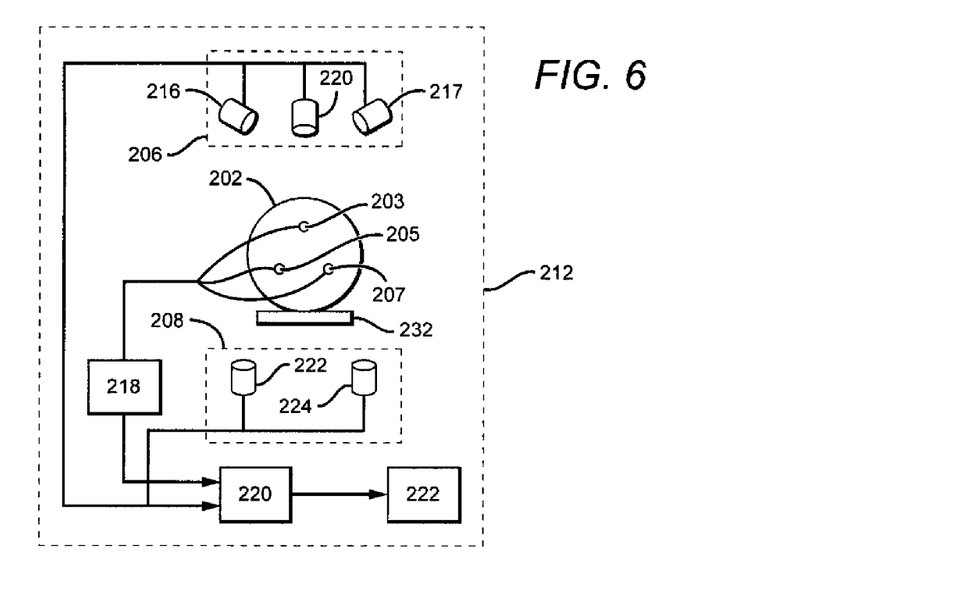
FIG. 6 shows another embodiment of the object tracking system with multiple sets of emitters and sensors.

FIG. 6 shows another embodiment of the object tracking system relating to a helmet tracking application that includes the features from the embodiment discussed in FIG. 1 applied to a tracked object 202 to track its position and orientation. In this embodiment, a front sensor array 206 is comprised of sensors 216, 217 and 220 and a rear sensor array 208 is comprised of sensors 222 and 224. The front and rear sensor arrays 206 and 208 can include more or fewer sensors; those shown in FIG. 6 are for illustrative purposes only. Additional sensors may be arranged around the tracked object 202 as well. As described in the embodiment shown in FIG. 1, each sensor 216, 217, 220, 222 and 224 is preferably comprised of one or more optical elements and an FPA. The optical elements comprise either a DOE and circular lens, birefringent lenses, or cylindrical lenses and produce linear patterns onto a FPA as described with respect to FIG. 1. The front sensor array 206 is arranged in a chamber 212, which can be part of any structure or vehicle. For example, the chamber can be a vehicle's interior cabin or a room inside a fixed structure. Examples of mobile vehicles include, but are not limited to, ground vehicles such as tanks, cars, etc., and/or aircraft and/or sea-based vehicles such as ships or submarines, and also space vehicles such as space shuttles and/or space stations etc. Fixed-structures can include, but are not limited to, watch towers, control towers and other immobile platforms, etc. Configurations with multiple sensors are preferred. The sensors are arranged to provide the best visibility of emitters on the helmet throughout the full range of head motion. For example, sensors may be placed in a forward-facing part of the chamber, such as the front of an airplane cockpit.

In one embodiment, the tracked object 202 is a helmet and the chamber 212 is an aircraft cockpit. The front sensor array 206 is preferably arranged in the front of a cockpit and a rear sensor array 208 is arranged at or behind a seatback 232. The front and back sensor array are arranged such that a sufficient number of emitters 203, 205 and 207 are detected for tracking the helmet's position and pose, even if the pilot looks behind him/herself, or forward, up or down.

In the helmet tracker embodiment, at least three point source emitters (203, 205 and 207) are preferably mounted to the surface of a pilot's helmet 202, hat, headset or other headgear, which serves as the tracked object. Preferably, the emitters are mounted so that at least some are in the FOV of the sensors that form the front and rear sensor arrays 206 and 208, respectively. Additional emitters may be mounted to the pilot's helmet to provide measurements throughout the full range of the head motion. As the pilot's head moves, the first and second (if necessary) sensor arrays 206 and 208 record images of the emitters and send the information to processing system 220, which calculates the angle of arrival using the tilt-line algorithm described with respect to the embodiment discussed in FIG. 1. These measurements are then processed by the processing system to determine a helmet pose estimate. Processing system 220 then forwards the helmet pose estimate to an output system 222, which uses the information to mirror the tracked object's position, orientation and movement onto a controlled object. The controlled object can be a weapon's guidance system, camera or any other local or remote mechanical device the pilot or operator wishes to control by moving his or her head. This allows a pilot or operator wearing the helmet/headgear to move or direct the controlled object hands-free simply by moving their head. For example, a fighter pilot with helmet-mounted emitters and front and rear sensor arrays 206 and 208 can link his or her helmet to the movable gun of the aircraft. Using the pose information of the helmet, the gun can point in the direction the pilot is facing. Alternatively, the helmet may be linked to a Heads Up Display ("HUD") to show the pilot where his head is pointing relative to the other objects appearing on the HUD.

An inertial measurement unit (IMU) (not shown) may be hard-mounted to the frame of the vehicle or aircraft containing the tracked object, and a second IMU might be attached to the tracked object, to provide additional input parameters such as angular rates and linear accelerations to the processing system. By recording the data produced from both IMUs, it is possible to determine which motions of the tracked object are due to the motion of the vehicle.

For example, assuming that the tracked object is a helmet, the two IMUs can be used to cancel the involuntary motions of the wearer's head that are a consequence of shock or vibration transmitted to the helmet through the wearer's body. This is done by looking for motion data from the helmet-mounted IMU which is similar to that produced by the frame-mounted IMU, except for being delayed in time and damped due to its transmission through the wearer's body. By subtracting one such IMU output from the other, involuntary motions of the head that are a consequence of shock or vibration transmitted to the helmet through the body can be determined—independent of where the wearer is trying to direct his gaze. This method of inertially limiting the motion of the tracked object to motion which is deliberate greatly increases the accuracy of the system.

Information provided by the second IMU might also be used instead of the 'random walk' process shown in FIG. 5 to drive the tracked object's process model in the state estimation algorithm. This is similar to the way strap-down navigation systems use IMUs. Such an approach can significantly increase estimation accuracy. Alternatively, integration of an IMU can enable a system with fewer point source emitters and/or sensors and lower frame rates to achieve the same estimation accuracy as a system which does not include an IMU, but which has more emitters and/or sensors.

Another embodiment of the object tracking system comprises the elements of the embodiments shown in FIGS. 1 and 6, and also includes an ambient light shielding system to filter out undesirable illumination from reaching the sensor array (106, 206). For example, an application that allows the user to view an outdoor scene may be designed to use ultraviolet ("UV") LEDs and sensors and employs a material or coatings on a transparent window that shields the user with the tracking system from ultraviolet ("UV") sunlight. The shielding system can be any material, layer or device that prevents undesirable illumination on the outside of the chamber 212 from entering and thereby interfering with the set of sensors inside the chamber.

Figure 7:
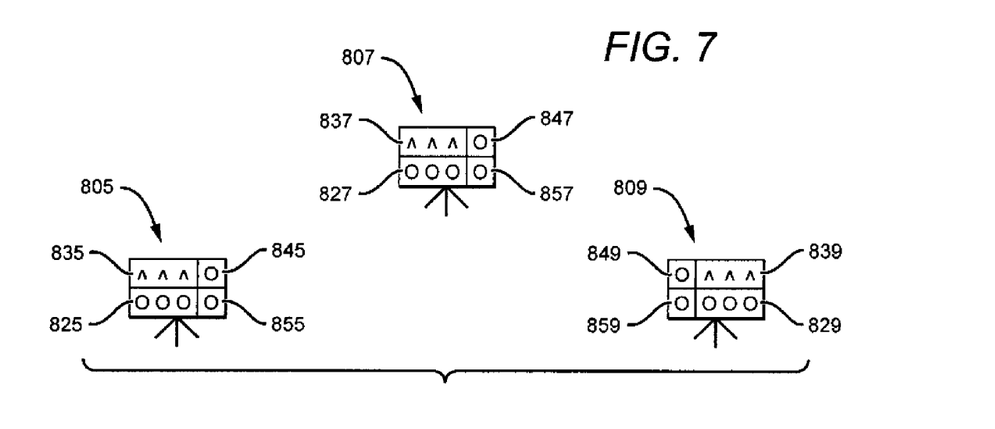
FIG. 7 shows another embodiment of the object tracking system with multiple nodes, each having their own sensor array(s) and point source emitter(s).

FIG. 7 shows another embodiment comprising multiple nodes 805, 807 and 809. Each node is comprised of a sensor array 825, 827 and 829 and optical emitters 835, 837, and 839, electronic control systems 845, 847, and 849 and processing systems 855, 857 and 859, respectively. The sensor array of a particular node is arranged to only detect optical emissions from the other nodes and not emissions from its own optical emitters. For example, the sensor array 825 in node 805 is arranged to only detect emissions from light emitters 837 and 839. This allows the sensor array 825 of node 805 to detect the pose and position of the emitters 837 and 839. In this manner, each node detects the position and pose of the other nodes.

For some applications, the structure supporting the sensors (or the structure supporting the point source emitters, when so configured) may flex under certain conditions, and thereby degrade the performance of a system which has been previously calibrated. For example, an aircraft fuselage—to which one or more sensors may be mounted—tends to expand with increased altitude. One calibration method that can be used to correct for such flexing requires at least 3 point source emitters, preferably LEDs, arranged in a fixed, preferably triangle-shaped array and mounted to a structure that does not flex along with the structure to which the sensors are mounted, and which is within the FOV of the sensors. For example, on an aircraft, the fixed array might be mounted to the back of the pilot's seat. Then, the system is arranged such that the sensors periodically look at the fixed array and recalibrate their position relative to the array.

For all embodiments, the electronic control system 118 and processing system 120 may be part of a single unit, or may be separate, electrically connected units. Additionally, the sensor array 106 and processing system 120 may be separate, electrically connected units, or combined as part of the same unit. Furthermore, the number of emitters and sensors and the arrangement/position of all elements shown in the figures is for illustrative purposes only, and can vary depending on the type of devices used and their application. The elements may be arranged differently, provided the sensor array is within the optical FOV of the set of emitters.

For all embodiments, the output of the tracking system, i.e. position, orientation and/or movement of the tracked object can be fed into one or more other guidance systems that manipulate a controlled system by substantially mirroring the tracked object. The controlled system/object can include, but is not limited to weapons systems such as guns mounted to vehicles/aircraft, missile guidance systems, gimbaled cameras or FLIRS, and other remotely operated/guided systems/machines.

For all embodiments, communication of information may be accomplished wirelessly. Also note that each sensor in the sensor array can also include an optical bandpass filter to block background light such as solar illumination.

While particular embodiments of the invention have been shown and described, numerous variations and alternate embodiments will occur to those skilled in the art. Accordingly, it is intended that the invention be limited only in terms of the appended claims.

What is claimed is:

1. An object tracking system, comprising:
    one or more point source emitters arranged to output respective optical emissions;
    at least one angle of arrival sensor, each of said sensors comprising:
        a focal plane array (FPA); and
        one or more optical elements arranged to transform said optical emissions into one or more linear patterns on said FPA, at least one of said sensors having a field of view (FOV) which encompasses at least one of said optical emissions such that said sensor detects at least one of said linear patterns; and
    a processing system in communication with said sensors and arranged to establish the orientation and position of the point source emitters within each sensor's FOV using said detected linear patterns.

2. The system of claim 1, wherein said point source emitters are located on an object to be tracked and said sensors are arranged within the tracked object's environment to detect said optical emissions over said object's full range of motion.

3. The system of claim 2, wherein said system is calibrated such that the positions of said point source emitters on said tracked object and the positions and orientations of said sensors within said environment are known.

4. The system of claim 1, wherein said sensors are located on an object to be tracked and said point source emitters are arranged within the tracked object's environment, said sensors arranged to detect said optical emissions over said object's full range of motion.

5. The system of claim 4, wherein said system is calibrated such that the positions and orientations of said sensors on said tracked object and the positions of said point source emitters sensors within said environment are known.

6. The system of claim 1, wherein at least one of said sensors is located on an object to be tracked and at least one of said point source emitters is located within the environment of the object, said sensors arranged to detect the optical emissions of at least one of said emitters over said object's full range of motion.

7. The system of claim 6, wherein said system is calibrated such that the positions of any point source emitters and the positions and orientations of any sensors on said tracked object are known, and such that the positions of any point source emitters and the positions and orientations of any sensors within said environment are known.

8. The system of claim 1, wherein said point source emitters comprise light emitting diodes (LEDs), lasers, or laser diodes.

9. The system of claim 1, further comprising an electronic control system in communication with said one or more point source emitters and said processing system, said electronic control system arranged to activate said one or more point source emitters and to identify an activated point source emitter to said processing system.

10. The system of claim 9, wherein said electronic control system is configured to activate said one or more of said point source emitters sequentially.

11. The system of claim 9, wherein each of said point source emitters has an associated identifying characteristic, said electronic control system configured to activate each of said point source emitters such that its identifying characteristic can be detected.

12. The system of claim 11, wherein said identifying characteristic is a unique identification number which is encoded within each sensor's optical emission.

13. The system of claim 11, wherein said identifying characteristic is a modulation frequency.

14. The system of claim 9, wherein said electronic control system is configured to activate said one or more of said point source emitters simultaneously.

15. The system of claim 14, wherein the relative spatial relationship between said point source emitters is known, said electronic control system configured to identify said point source emitters using a data association means based on said known spatial relationship.

16. The system of claims 15, wherein said electronic control system employs a maximum likelihood criterion as said data association means.

17. The system of claim 1, wherein said optical elements comprise a diffractive optical element (DOE) configured to receive an optical emission and to output a pair of perpendicular lines that form a cross pattern onto said FPA.

18. The system of claim 17, wherein said optical elements further comprise a lens.

19. The system of claim 1, wherein said optical elements comprise two orthogonal uniaxial birefringent cylindrical lens assemblies.

20. The system of claim 1, wherein each of said linear patterns comprise a pair of perpendicular lines.

21. The system of claim 1, wherein said optical elements comprise cylindrical lenses and said sensors are arranged so that at least one of said sensors measures the horizontal angle of arrival of an optical emission and at least one of said sensors measure the vertical angle of arrival of said optical emission.

22. The system of claim 1, wherein said processing system is configured to utilize a sigma-point Kalman filter for pose estimation.

23. The system of claim 1, wherein at least some of said point source emitters are mounted on an object to be tracked and said object is within a vehicle, further comprising a first inertial measurement unit (IMU) mounted to the frame of said vehicle and a second IMU mounted on said object to be tracked, said processing system arranged to receive information about the motion of said vehicle and said tracked object from said IMUs so as to cancel the involuntary motions of the object that are a consequence of shock or vibration transmitted to the object through said frame.

24. The system of claim 1, wherein at least some of said sensors are mounted on an object to be tracked and said object is within a vehicle, further comprising a first inertial measurement unit (IMU) mounted to the frame of said vehicle and a second IMU mounted on said object to be tracked, said processing system arranged to receive information about the motion of said vehicle and said tracked object from said IMUs so as to cancel the involuntary motions of the object that are a consequence of shock or vibration transmitted to the object through said frame.

25. The system of claim 1, wherein said FPAs are arranged to detect the angle of arrival of an incoming optical emission to within 1 milliradian.

26. The system of claim 1, wherein said tracked object is a helmet.

27. The system of claim 1, wherein said system comprises multiple point source emitters and/or sensors, said system arranged such that the relative spatial relationship between the emitters and/or sensors mounted to the tracked object remains fixed while the system is operating, and that the relative spatial relationship between the emitters and/or sensors arranged within the tracked object's environment must also remain fixed while the system is operating.

28. The system of claim 1, wherein said sensors are mounted to a first structure, further comprising at least three point source emitters arranged in a fixed array and mounted to a second structure which does not flex along with said first structure and which is within the field-of-view of said sensors, said system arranged to periodically establish the orientation and position of the point source emitters in said array so as to recalibrate the position of said sensors relative to said array.

29. The system of claim 1, wherein said point source emitters are located on an object to be tracked, said system further comprising a sensor array, each of which comprises one or more of said angle of arrival sensors, said sensor arrays arranged such that said object to be tracked is within the optical FOV of at least one of said sensor arrays.

30. A headgear tracking system, comprising:
one or more point source optical emitters arranged on a piece of headgear to output respective optical emissions;
a front sensor array and a rear sensor array, each of said sensor arrays comprising one or more angle of arrival sensors, each of said sensors comprising:
a focal plane array (FPA); and
one or more optical elements arranged to resolve said optical emissions into one or more linear patterns on said FPA, at least one of said sensors having a field of view (FOV) which encompasses at least one of said optical emissions such that said sensor detects at least one of said linear patterns; and a processing system in communication with said front and rear sensor arrays, said processing system configured to establish the orientation and position of the point source emitters within each sensor's FOV using said detected linear patterns.

31. The system of claim 30, wherein said point source emitters comprise light emitting diodes (LEDs), lasers, or laser diodes.

32. The system of claim 30, further comprising an electronic control system in communication with said one or more point source optical emitters and said processing system for activating said one or more point source optical emitters and identifying an activated point source emitter to said processing system, wherein said electronic control system is configured to activate said one or more point source optical emitters sequentially.

33. The system of claim 30, wherein said optical elements comprise a diffractive optical element (DOE) and a lens assembly configured to receive an optical emission and to output a pair of perpendicular lines that form a cross pattern onto one or more of said FPAs.

34. The system of claim 30, further comprising at least one inertial measurement unit (IMU).

35. The system of claim 30, wherein said processing system is configured to utilize a sigma-point Kalman Filter for pose estimation.

36. The system of claim 30, wherein said headgear is a helmet and said front and rear sensor arrays are located in an aircraft cockpit.

37. An object tracking system, comprising:

a plurality of nodes, each of said nodes comprising:

one or more point source emitters arranged to output respective optical emissions;

a sensor array, each of said detector arrays comprising one or more angle of arrival sensors, each of said sensors comprising:

a focal plane array (FPA); and one or more optical elements arranged to resolve said optical emissions into one or more linear patterns on said FPA, at least one of said sensors having a field of view (FOV) which encompasses at least one of said optical emissions such that said sensor detects at least one of said linear patterns; and a processing system in communication with said sensor array and arranged to establish the orientation and position of the point source emitters within each sensor's FOV using said detected linear patterns;

said system arranged such that the sensor of a given node only detects optical emissions received from other nodes and not the optical emissions of said node's own point source emitters.

* * * * *